Oct. 12, 1948. T. H. AFFLECK 2,451,268
FINGER TIP CONTROL FOR TRACTOR-TRAILER AIR BRAKE SYSTEMS
Filed May 13, 1944 2 Sheets-Sheet 1
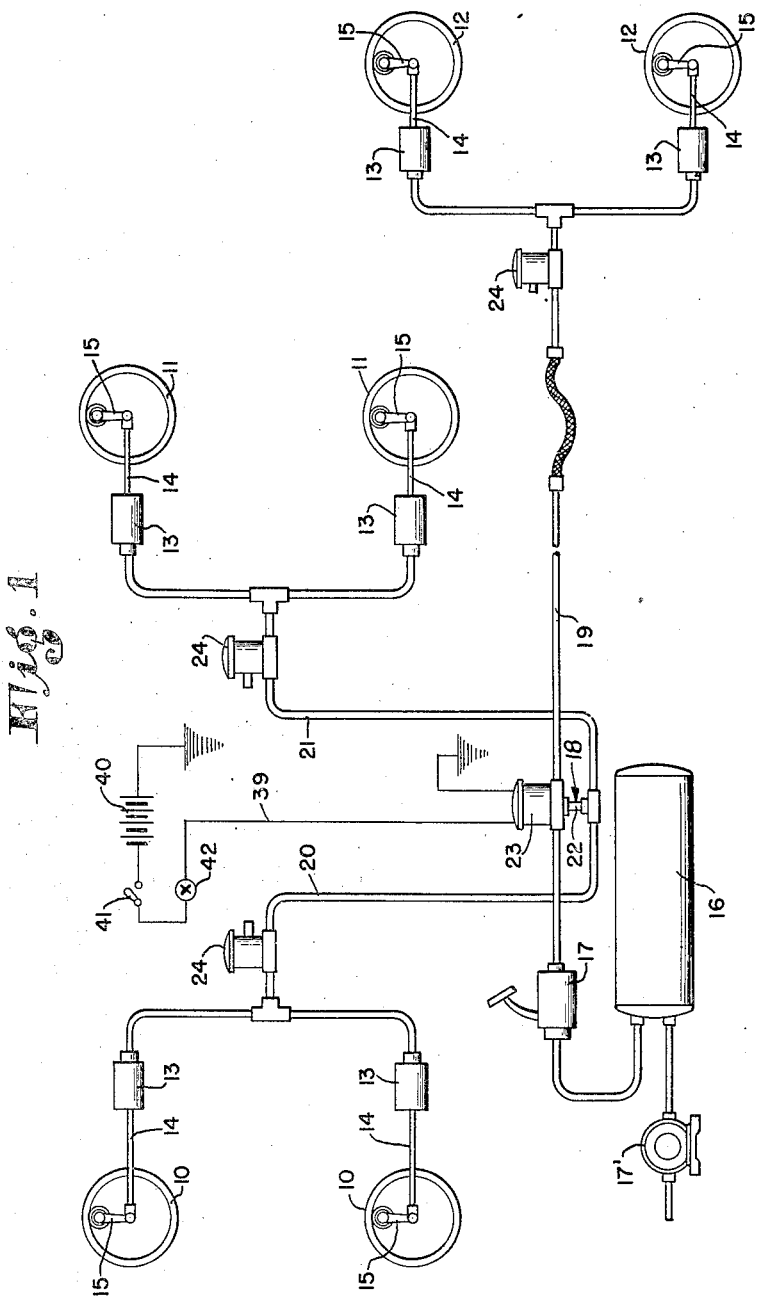
INVENTOR.
THEODORE H. AFFLECK
BY
ATTORNEY Oct. 12, 1948.     T. H. AFFLECK     2,451,268
FINGER TIP CONTROL FOR TRACTOR-TRAILER AIR BRAKE SYSTEMS
Filed May 13, 1944     2 Sheets-Sheet 2
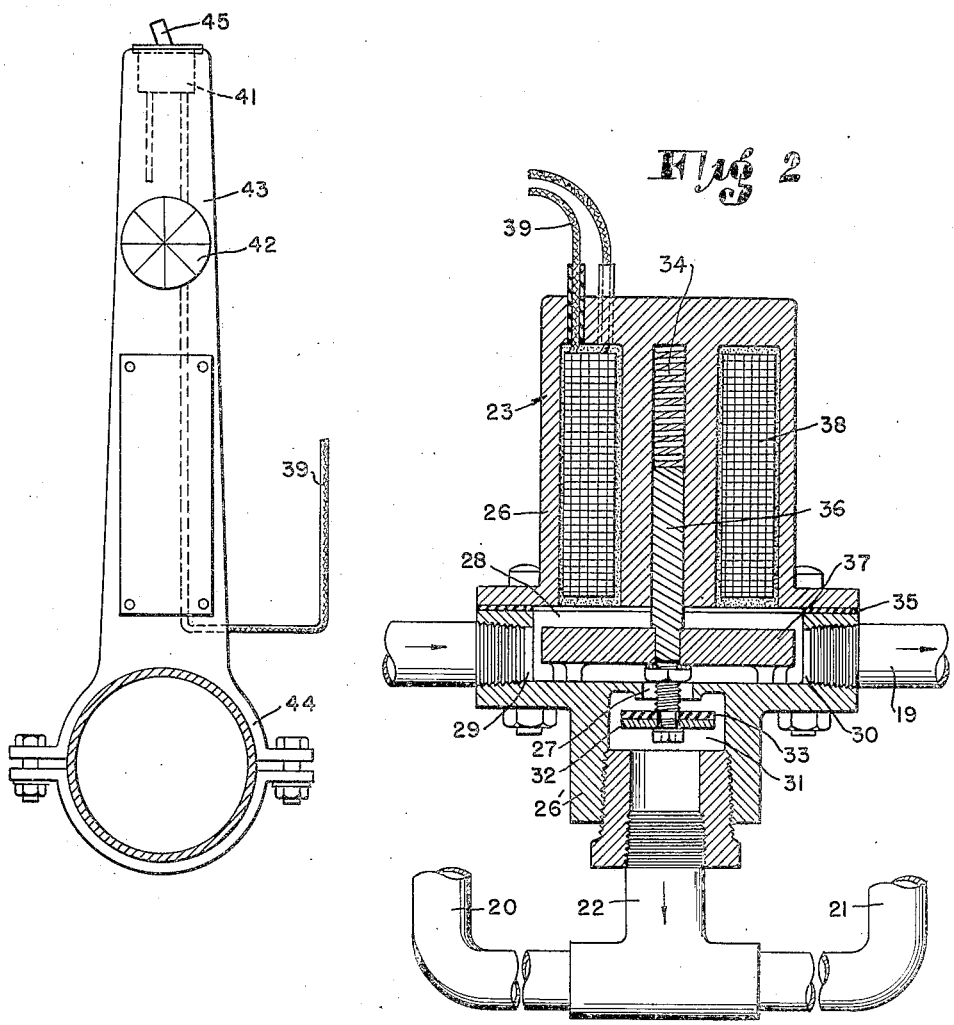
INVENTOR.
THEODORE H AFFLECK
BY
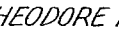
ATTORNEY Patented Oct. 12, 1948

2,451,268

UNITED STATES PATENT OFFICE 2,451,268

FINGER-TIP CONTROL FOR TRACTOR-TRAILER AIR BRAKE SYSTEMS

Theodore H. Affleck, North Hollywood, Calif., assignor, by mesne assignments, to William A. Cooke, Hollywood, Calif.

Application May 13, 1944, Serial No. 535,520

13 Claims. (Cl. 188—3)

My invention relates in general to power brakes for vehicles, and relates in particular to a simple control for the air brakes employed on a vehicle and one or more trailers which may be pulled by the vehicle.

It is an object of the invention to provide a simple arrangement which will replace the present hand valve and double check valve now used to control the brakes of a trailer independently of the operation of the foot pedal, making it possible for the driver of the vehicle to control the trailer brakes independently through operation of the foot pedal or other main brake controlling means.

An advantage of the invention lies in its simplicity of operation and its economy of installation in existing brake systems or in the original installation of a complete braking system involving the invention.

An important object of the invention is to provide a simple means whereby the driver of the vehicle may actuate the brakes of the trailer independently so that during downhill travel of the vehicle and trailer the forward movement of the trailer will be retarded to the desired degree to prevent the trailer from crowding forwardly toward the vehicle. The invention thus assures that complete control of the movement and the steering of the trailer is achieved at all times during downhill travel.

A further object of the invention is to provide a simple valve means for shutting off the conduit to the vehicle brake actuating or controlling means, so that the main control of the brake system—for example, the foot pedal—will then act only through the conduit leading to the trailer brake actuating means or controlling means. This arrangement eliminates all the working parts of the hand valve now employed as separate means for controlling the trailer brakes and likewise avoids the disadvantages which are found in the use of such hand valve. Where a leak develops in the hand valve, the braking effect is lost due to this leakage, but in my invention the development of a leak in the supplementary control valve results in added braking effect, since any leakage through this valve will pass through the conduit means leading to the brake actuating or controlling members associated with the vehicle brakes.

An object of the invention is to provide a braking system having a magnetic shut off valve which may be readily connected into the conduit leading to the vehicle brake actuating means, and a control switch for this magnetic shut off valve disposed conveniently for manipulation by the operator of the vehicle. Through use of this simple arrangement the operator of the vehicle may limit the use of his customary brake controlling lever, for example a foot pedal or a hand lever, to control of the trailer brake, or should he desire to leave the cab of the vehicle for a short period, he may make a full application of the brakes with his main valve and while the brakes of both trailer and vehicle are applied he may actuate the hand switch so as to close the magnetic valve to trap fluid in the conduits which lead to the vehicle brake actuating means, with the result that upon releasing his main control, the fluid thus trapped will maintain the vehicle brakes locked.

Further objects and advantages of the invention will be brought out in the following part of the specification.

Referring to the drawing, which is for illustrative purposes only,

Fig. 1 is a diagrammatic drawing of a braking system embodying my invention.

Fig. 2 is a sectional view of the magnetic shut off valve employed therein.

Fig. 3 is a view of the control arm.

In Fig. 1 I show front vehicle brakes 10 and rear vehicle brakes 11 such as employed in conjunction with the four wheels of a vehicle, such as a truck adapted to pull a trailer. Brakes 12 of similar type are shown for control of the wheels of a trailer. For the purpose of illustration only, I have indicated that the brakes 10, 11, and 12 are actuated by cylinder piston devices 13 which are connected, as by links 14, with the brake levers 15. It will be understood that in the practice of my invention it makes no difference whether the cylinder-piston devices 13 are actuated by pressure delivered directly from a main control valve, such as a foot pedal actuated valve on the truck, or whether such main control valve merely controls a flow of fluid through pilot conduits to actuate separate control valves situated near the brakes and functioning to connect the cylinder-piston devices 13 with separate sources of fluid pressure differential in accordance with known brake practices.

In the brake system shown an air pressure tank 16, charged by means of a pump 17′, provides a source of fluid pressure differential which is connected through a main control valve 17 with first conduit means 18 which is connected to the brake actuating means 13 of the vehicle, and second conduit means 19 which is connected to the brake actuating means 13 of the trailer. The conduit means 18 is bifurcated so as to provide conduits 20 and 21 for serving respectively the front and rear brakes of the vehicle, and at the juncture of the conduits 20 and 21 with the conduit piece 22 of the conduit means 18 there is a shut off valve 23 which is normally open. In each of the conduits 20 and 21 and also in the conduit means 19, near the respective vehicle and trailer brakes, there is inserted a quick pressure release valve 24 which is closed when pressure is applied through the conduit means 18 and 19 as the result of the operation of the main control valve 17, and which connects the cylinder-piston devices 13 with the open atmosphere when pressure is released from the conduit means 18 and 19 by suitable releasing operation of the main control valve 17.

As shown in Fig. 2, the magnetic shut off valve 23 comprises a casing having a portion 26 and a portion 26', the portion 26' having an inlet port 27 which is connected to the conduit member 22 and a transverse passage 28 which connects the port 27 with ports 29 and 30, connected respectively to the conduits 20 and 21. The casing 26' has in opposed relation to the port 27 a bore 31 in which a valve member 32 is slidable toward and away from the port 27. This valve member 32 has thereon a closure disc 33 of suitable resilient material which is moved into closing relation to the port 27 when the valve member 32 is moved against the action of a coil spring 34 which tends to hold the valve 32 in open position. A sealing gasket 35 is interposed in the connection between the casing portions 26 and 26' to prevent air leakage from the passage 28.

A stem 36 projects from the valve member 32 and supports an armature 37 in operative relation to a solenoid winding or coil 38 which is in an electric circuit 39, also including a battery 40, a switch 41 and a signal lamp 42. When the switch 41 is closed, the coil 38 is energized and the closure 33 is moved into a position to close the port 27. The switch 41 is mounted at the outer end of the control arm 43 having means at its inner end 44 whereby it may be secured to the steering post of the vehicle. This arm 44 is of such length that the operating lever 45 of the switch 41 will be positioned below the rim of the steering wheel where it may be easily operated by the finger-tips of one hand of the driver of the vehicle.

During the normal operation of the vehicle the closure 33 is retained in open position so that when the driver of the vehicle manipulates the control valve 17, all of the brakes shown in Fig. 1 will be applied as a result thereof. Should the vehicle and trailer be traveling downgrade, the driver may swing the switch member 45 and thereby close the switch 41 so as to energize the coil 38. This will result in closing the port 27. The driver then operates the control valve 17 in the customary manner and the controlling flow of fluid resulting therefrom will pass only through the conduit means 19 to the brake actuating means 13 associated with the brakes 12 of the trailer, the conduit means 18 being at this time closed. Accordingly, the driver may produce a slight actuation of the trailer brakes so as to apply a slight drag which will prevent the trailer from crowding the vehicle. When the vehicle and trailer are stopped, the driver may operate the control valve 17 so as to accomplish application of all of the brakes. He may then close the switch 41 which will result in moving the closure 33 into closed relation to the port 27, thereby preventing a flow of fluid through the conduits 20 and 21 which would result in releasing the brakes 10 and 11. It will be understood that the release of the control valve 17 at this time will result in a release of the trailer brakes 12, but the brakes 10 and 11 of the vehicle will remain applied until the valve 23 is opened. This may be accomplished by the driver's making a full application of the brakes, through operation of the main control valve 17 and concurrently therewith having the switch 41 in open condition so that the coil 38 will be deenergized, whereupon the spring 34 will move the valve member 32 into open position.

I have herein described the details of a simple form of my invention, but it will be understood that the invention is not limited to details of construction, but is of the scope embraced by the wording of the following claims.

I claim as my invention:

1. In an air brake system for a vehicle and trailer having vehicle brake actuating means and trailer brake actuating means adapted to be actuated by air, the combination of: a source of air supply; air valve means for controlling the flow of air from said supply; first conduit means for conducting air from said valve means to said vehicle brake actuating means; second conduit means for conducting air from said valve means to said trailer brake actuating means; a magnetic valve in said first conduit means comprising an inlet port and an outlet port through which the air passes, a closure for said inlet port to prevent a flow of air therethrough, means to normally hold said closure in its open position, an armature connected to said closure, and an electric coil to move said armature in a direction to close said closure; a support projecting from the steering post of the vehicle; electric circuit means having therein said coil and a source of electric current; and switch means at the outer end of said support for closing said circuit so as to energize said coil whereby said closure will be moved into closed position so as to prevent a flow of air through said first conduit to said vehicle brake actuating means so that the operation of said air valve means will result only in the operation of said trailer brake actuating means or whereby air may be trapped in said first conduit means to lock said vehicle brake actuating means in applied condition.

2. In an air brake system for a vehicle and trailer having vehicle brake actuating means and trailer brake actuating means adapted to be actuated by air, the combination of: a source of air supply; air valve means for controlling the flow of air from said supply; first conduit means for conducting air from said valve means to said vehicle brake actuating means; second conduit means for conducting air from said valve means to said trailer brake actuating means; a magnetic valve in said first conduit means comprising an inlet port and an outlet port through which the air passes, a closure for said inlet port to prevent a flow of air therethrough, means to normally hold said closure in its open position, an armature connected to said closure, and an electric coil to move said armature in a direction to close said closure; an electric circuit means having therein said coil and a source of electric current; and a switch convenient for operation by an operator for closing said circuit so as to energize said coil whereby said closure will be moved into closed position so as to prevent a flow of air through said first conduit to said vehicle brake actuating means so that the operation of said air valve means will result only in the operation of said trailer brake actuating means or whereby air may be trapped in said first conduit means to lock said vehicle brake actuating means in applied condition.

3. In an air brake system for a vehicle and trailer having vehicle brake actuating means and trailer brake actuating means adapted to be actuated by air, the combination of: a source of air supply; air valve means for controlling the flow of air from said supply; first conduit means for conducting air from said valve means to said vehicle brake actuating means; second conduit means for conducting air from said valve means to said trailer brake actuating means; a magnetic valve in said first conduit means comprising a passage through which the air passes, a closure for said passage to prevent movement of air therethrough, said closure being normally in open position, an armature connected to said closure, and an electric coil to move said armature in a direction to close said closure; a support projecting from the steering post of the vehicle; electric circuit means having therein said coil and a source of electric current; and switch means at the outer end of said support for closing said circuit so as to energize said coil whereby said closure will be moved into closed position so as to prevent a flow of air through said first conduit to said vehicle brake actuating means so that the operation of said air valve means will result only in the operation of said trailer brake actuating means or whereby air may be trapped in said first conduit means to lock said vehicle brake actuating means in applied condition.

4. In an air brake system for a vehicle and trailer having vehicle brake actuating means and trailer brake actuating means adapted to be actuated by air, the combination of: a source of air supply; air valve means for controlling the flow of air from said supply; first conduit means for conducting air from said valve means to said vehicle brake actuating means; second conduit means for conducting air from said valve means to said trailer brake actuating means; a magnetic valve in said first conduit means comprising a passage through which the air passes, a closure for said passage to prevent movement of air therethrough, said closure being normally in open position, an armature connected to said closure, and an electric coil to move said armature in a direction to close said closure; an electric circuit means having therein said coil and a source of electric current; and a switch convenient for operation by an operator for closing said circuit so as to energize said coil whereby said closure will be moved into closed position so as to prevent a flow of air through said first conduit to said vehicle brake actuating means so that the operation of said air valve means will result only in the operation of said trailer brake actuating means or whereby air may be trapped in said first conduit means to lock said vehicle brake actuating means in applied condition.

5. In an air brake system for a vehicle and trailer having vehicle brake actuating means and trailer brake actuating means adapted to be actuated by air, the combination of: a source of air supply; air valve means for controlling the flow of air from said supply; first conduit means for conducting air from said valve means to said vehicle brake actuating means; second conduit means for conducting air from said valve means to said trailer brake actuating means; a closure for said first conduit to prevent movement of air therethrough; and electrical remote control means under control of an operator for closing said closure so as to prevent a flow of air through said first conduit to said vehicle brake actuating means so that the operation of said air valve means will result only in the operation of said trailer brake actuating means or whereby air may be trapped in said first conduit means to lock said vehicle brake actuating means in applied condition.

6. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a magnetic valve in said first conduit means comprising an inlet port and an outlet port through which the fluid passes, a closure for said inlet port to prevent a flow of fluid therethrough, means to normally hold said closure in its open position, an armature connected to said closure, and an electric coil to move said armature in a direction to close said closure; a support projecting from the steering post of the vehicle; electric circuit means having therein said coil and a source of electric current; and switch means at the outer end of said support for closing said circuit so as to energize said coil whereby said closure will be moved into closed position so as to prevent a flow of fluid through said first conduit to said vehicle brake actuating means so that the operation of said main control means will result only in the operation of said trailer brake actuating means or whereby fluid may be trapped in said first conduit means to lock said vehicle brake actuating means in applied condition.

7. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a magnetic valve in said first conduit means comprising an inlet port and an outlet port through which the fluid passes, a closure for said inlet port to prevent a flow of fluid therethrough, means to normally hold said closure in its open position, an armature connected to said closure, and an electric coil to move said armature in a direction to close said closure; an electric circuit means having therein said coil and a source of electric current; and a switch convenient for operation by an operator for closing said circuit so as to energize said coil whereby said closure will be moved into closed position so as to prevent a flow of fluid through said first conduit to said vehicle brake actuating means so that the operation of said main control means will result only in the operation of said trailer brake actuating means.

8. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a magnetic valve in said first conduit means comprising a passage through which the fluid passes, a closure for said passage to prevent movement of fluid therethrough, said closure being normally in open position, an armature connected to said closure, and an electric coil to move said armature in a direction to close said closure; an electric circuit means having therein said coil and a source of electric current; and a switch convenient for operation by an operator for closing said circuit so as to energize said coil whereby said closure will be moved into closed position so as to prevent a flow of fluid through said first conduit to said vehicle brake actuating means so that the operation of said main control means will result only in the operation of said trailer brake actuating means.

9. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a closure for said first conduit to prevent movement of fluid therethrough; remotely controllable means for closing said closure so as to prevent a flow of fluid through said first conduit to said vehicle brake actuating means so that the operation of said main control means will result only in the operation of said trailer brake actuating means; and operating means positioned conveniently for operation by an operator and spaced from said remotely controllable means for operating said remotely controllable means.

10. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a normally open passageway in communication with said first conduit means; means including a closure for effectuating the closing of said passage-way; and relatively lightly movable means associated with the last said means for actuating said means to close said closure to prevent a flow of fluid through said first conduit means to said vehicle brake actuating means so that the operation of said main control means will effectuate only the operation of said trailer brake actuating means.

11. In a brake system for a vehicle having a fluid controlled brake actuating means and a trailer having fluid controlled brake actuating means, the combination of: first conduit means on said vehicle connected to said vehicle brake actuating means; second conduit means connected to said trailer brake actuating means; main control means controllable by an operator for producing a fluid pressure differential in both of said conduit means to control the operation of said brake actuating means; a normally open passageway in communication with said first conduit means; means responsive to influences other than the forces in the fluid system, and including a closable member, for closing said passageway; and means actuatable by finger tip pressure for actuating the aforesaid responsive means to prevent a flow of fluid through said first conduit means to said vehicle brake actuating means so that the operation of said main control means will result in the operation of said trailer brake actuating means only.

12. In a fluid braking system for a vehicle and trailer having separate brakes, the combination of: actuating means for the trailer brakes responsive to pressure differential variations, actuating means for the vehicle brakes responsive to pressure differential variations, a pressure energy source connected with both said first and second actuating means, main control means associated with said source and manually operable to apply pressure differential to the first actuating means, a second energy source different from the first energy source, and means operable from said second energy source to selectively connect and disconnect the second actuating means with respect to the main control, whereby both trailer and vehicle brakes may be simultaneously actuated or the trailer brakes only actuated by said main control means.

13. In a fluid braking system for a vehicle and trailer having separate brakes, the combination of: actuating means for the trailer brakes, actuating means for the vehicle brakes, a first energy source having a connection with said first and second actuating means, main control means for controlling the energization of the first actuating means from said first energy source, a second energy source, and finger control means operable from said second energy source to selectively connect and disconnect the second actuating means with respect to the main control, whereby both trailer and vehicle brakes may be simultaneously actuated or the trailer brakes only actuated by said main control means.

THEODORE H. AFFLECK.

REFERENCES CITED

The following references are of record in the file of this patent:

UNITED STATES PATENTS

| Number | Name | Date |
|---|---|---|
| 1,650,488 | Bragg et al. | Nov. 22, 1927 |
| 1,865,090 | Donovan | June 28, 1932 |
| 1,872,659 | Bragg et al. | Aug. 23, 1932 |
| 2,258,881 | Brown | Oct. 14, 1941 |